United States Patent [19]

Hachtel et al.

[11] Patent Number: 4,986,709
[45] Date of Patent: Jan. 22, 1991

[54] FASTENING ELEMENT ASSEMBLY

[75] Inventors: Hans Hachtel, Schaanwald, Liechtenstein; Michael Maier, Feldkirch-Tisis; Gerhard Ehmig, Rankweil, both of Austria

[73] Assignee: Hilti Aktiengesellschaft, Liechtenstein

[21] Appl. No.: 456,305

[22] Filed: Dec. 26, 1989

[30] Foreign Application Priority Data

Dec. 23, 1988 [DE] Fed. Rep. of Germany ....... 3843391

[51] Int. Cl.$^5$ .............................................. F16B 13/04
[52] U.S. Cl. ........................................ 411/30; 411/44; 411/387; 411/441
[58] Field of Search .................. 411/30, 31, 44, 386, 411/387, 440, 441

[56] References Cited

U.S. PATENT DOCUMENTS

| 1,996,121 | 4/1935 | Phillips | 411/31 |
| 3,412,594 | 11/1968 | Lund | 411/30 |
| 3,480,306 | 11/1969 | Hsu | |
| 3,851,560 | 12/1974 | Yago | 411/30 |
| 4,257,307 | 3/1981 | Regensburger | 411/387 |
| 4,287,656 | 9/1981 | Gassman et al. | |
| 4,293,258 | 10/1981 | McKewan | 411/30 |
| 4,395,174 | 7/1983 | Freeman | 411/387 X |
| 4,480,951 | 11/1984 | Regensburger | 411/387 X |
| 4,518,290 | 5/1985 | Frichmann et al. | 411/30 |
| 4,617,692 | 10/1986 | Bond et al. | 411/387 X |
| 4,673,320 | 6/1987 | Froehlich | 411/30 X |

FOREIGN PATENT DOCUMENTS

| 1116686 | 5/1956 | France | 411/30 |
| 585887 | 2/1947 | United Kingdom | 411/386 |

Primary Examiner—Gary L. Smith
Assistant Examiner—Jerry Redman
Attorney, Agent, or Firm—Toren, McGeady & Associates

[57] ABSTRACT

A fastening element assembly for use in a hard receiving material, such as concrete, masonry and the like, includes a sleeve and a fastening element or bolt. The sleeve forms a blind bore in the receiving material. At its leading end, in the insertion direction, the sleeve has a cutting edge. The sleeve is rotated by rotational force transmitted to engagement faces on the sleeve. After the borehole is drilled by the sleeve, the bolt is driven through the sleeve into the receiving material.

7 Claims, 2 Drawing Sheets

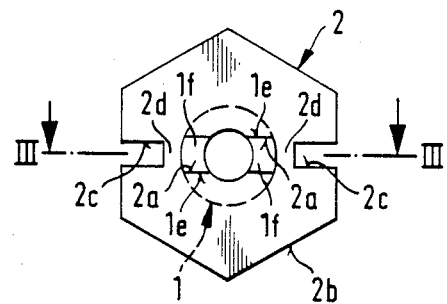
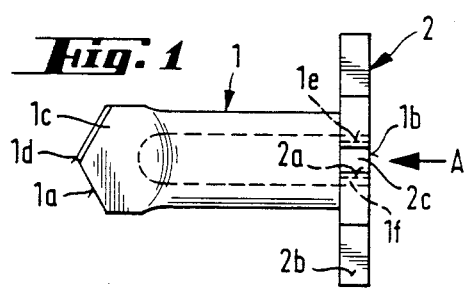
Fig. 1
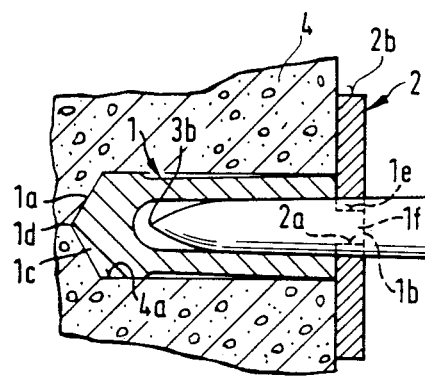
Fig. 2
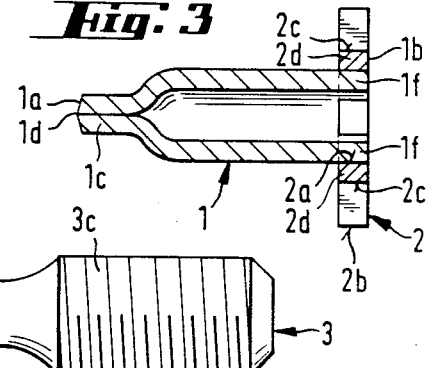
Fig. 3
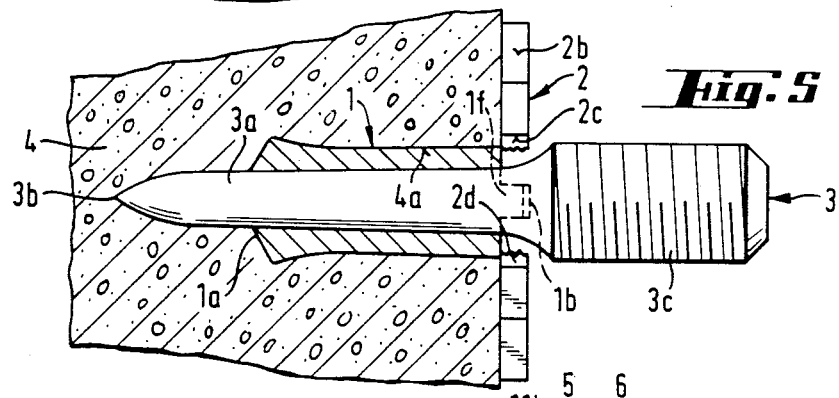
Fig. 4
Fig. 5
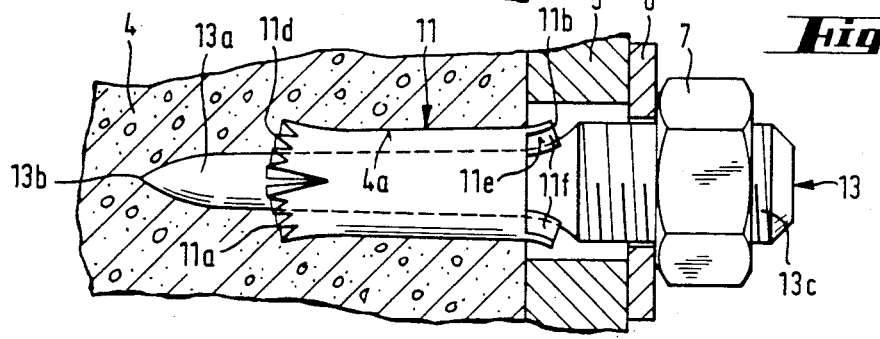
Fig. 6 ately larger than the diameter of the shank of the fastening element and with a length at least twice its diameter. After the borehole is formed, the fastening element is driven through the base of the borehole. As a result, maximum compression stresses are displaced from the surface of the receiving material to a location inwardly of the surface. Accordingly, the spalling, as mentioned above, can be avoided. Apart from the separate drilling tool, needed for forming a borehole for the fastening element, it has also been known to shape the leading end of the fastener as a drilling or cutting edge, whereby the fastening element can cut its own borehole. Such an arrangement is quite costly, in part, because of the use of hard metal cutting plates or the like.

FASTENING ELEMENT ASSEMBLY

BACKGROUND OF THE INVENTION

The present invention is directed to a fastening element assembly for use in a hard receiving material, such as concrete, masonry and the like, and includes a sleeve and a bolt. The bolt has a pointed tip at the leading end of a shank extending toward the trailing end. The shank has an axial length greater than that of the sleeve. Further, the shank has an outside shape corresponding at least in part to an inside shape of the sleeve.

At the present time, apart from installation by drilling, so-called direct installation is used for securing fastening elements in hard and brittle receiving materials, such concrete, masonry and the like. In direct installation, a nail-like fastening element is driven directly into the receiving material by an explosive powder charge operated setting tool without any prior drilling of the receiving material. When it is driven in, the fastening element causes a displacement of the receiving material in the region of its insertion. Very high compressive stresses develop in the receiving material due to its displacement when the fastening element is driven in, producing spalling at the surface of the receiving material. Such spalling is not only aesthetically undesirable, but it also results in a considerable reduction in the anchoring value of the fastening element.

To avoid spalling and associated failure of a fastening element anchorage, it is known from DE-PS 28 49 139 corresponding to U.S. Pat. No. 4,287,656, to drill a borehole in the receiving material prior to driving the fastening element, with the borehole having a diameter slightly larger than the diameter of the shank of the fastening element and with a length at least twice its diameter. After the borehole is formed, the fastening element is driven through the base of the borehole. As a result, maximum compression stresses are displaced from the surface of the receiving material to a location inwardly of the surface. Accordingly, the spalling, as mentioned above, can be avoided. Apart from the separate drilling tool, needed for forming a borehole for the fastening element, it has also been known to shape the leading end of the fastener as a drilling or cutting edge, whereby the fastening element can cut its own borehole. Such an arrangement is quite costly, in part, because of the use of hard metal cutting plates or the like.

In a procedure set forth in U.S. Pat. No. 3,480,306, a cylindrical sleeve is inserted into a previously formed borehole and, subsequently, a fastening element is driven into the sleeve. The sleeve is widened radially and expanded into the borehole due to the driving of the fastening element. The tip of the fastening element can penetrate into the receiving material through the base of the borehole for a greater or lesser depth. This procedure requires a relatively high expenditure of time for fabrication of the borehole.

SUMMARY OF THE INVENTION

The primary object of the present invention is to provide a fastening element capable of being driven into a receiving material in a simple and economical manner and affording good anchoring values.

In accordance with the present invention, the sleeve is formed with engagement faces for use in transmitting rotary motion or rotary-striking motion to the sleeve so that it can be drilled into the receiving material. Further, the leading end of the sleeve is provided with a cutting edge.

In accordance with the present invention, the sleeve can cut a borehole in the receiving material similar to a so-called self-drilling dowel. The cutting edge is formed so that it removes the drilled receiving material. For an effective removal of the drilled material, the cutting edge of the drilling element is somewhat wider than the outside diameter of the sleeve. The rotary drive for the sleeve is effected via engagement faces on the sleeve. Accordingly, the setting or placement of the fastener element takes place in two steps. In a first step, the borehole is produced by the sleeve and, at the same time, the sleeve is inserted into the borehole. After completion of the drilling operation, the fastening element or bolt, in a second step, is driven through the sleeve and the base of the borehole into the receiving material, preferably by means of an explosive powder charge operated setting tool. The anchorage of the bolt is achieved, on the one hand, by a kind of sintering effect directly into the receiving material and, on the other hand, by a positive frictional lock with the expanding sleeve which widens radially in the borehole.

Preferably, the drilling cutting edge is formed by an arrowhead-shaped cutter plate having a central tip and extending essentially diametrically across the leading end of the sleeve. The cutter plate can be formed integrally with the sleeve, or it can be in the form of a hard metal plate soldered into a slot in the sleeve. A drilling cutting edge in the form of a cutter plate is characterized by a high drilling output, good removal of the drillings or drilled material, and a precise shape of the borehole. Due to the central tip at the cutting edge, the base of the borehole, produced by the cutting edge, is conically shaped. Such conical shaping affords centering during the penetration of the tip of the bolt or fastening element into the receiving material when it is subsequently driven in. Further, a drilling cutting edge with a central tip facilitates accurate spot drilling into the receiving material.

Another preferred embodiment involves the use of a drilling cutting edge as an annular drill bit extending around the leading end face of the sleeve and containing at least three cutting teeth. The drilling cutting edge in the form of an annular drill bit is particularly advantageous in very hard, brittle receiving materials, such as concrete containing high hardness gravel. The cutting teeth produce a high surface quality within the borehole.

In yet another preferred embodiment, the engagement faces afford frictionally locked engagement with the shank of the bolt, with the engagement faces extending in the circumferential direction along the inside surface of the sleeve. Such a frictional lock can be achieved by an appropriate fit between the tip end of the bolt shank and the inside surface of the sleeve providing a force fit therebetween. Furthermore, the shank of the bolt can be configured to widen conically toward its trailing end, whereby a known self-locking conical fit is produced between the bolt and the sleeve.

In one embodiment, the engagement faces extend transversely of the circumferential direction of the sleeve. Such engagement faces can be formed as flat wrenching faces arranged in pairs for the application of a fork wrench. If special wrenches are used, the engagement faces can have any random polygonal shape.

In still another preferred embodiment, the engagement faces are arranged in the inside surface of the sleeve with the sleeve having a non-circular shape for affording a positive locking connection with the shank of the bolt. The rotary drive of the sleeve is effected through the bolt. The engagement faces can be formed as cams engaging in a positively locking manner into grooves in the shank of the bolt. Such cams in the sleeve not only transmit torque, but they also afford axial securement of the sleeve on the shank of the bolt. The cam on the sleeve can be fabricated after assembling the sleeve and the bolt by a stamping operation on the sleeve in the region of axially extending grooves in the bolt shank. If the cams are formed in the sleeve before it is assembled with the bolt, then the cams can snap into the axially extending grooves when the sleeve is placed on the bolt shank.

In a further preferred embodiment, the engagement faces are formed in the region at the trailing end of the sleeve for positive locking connection with a guide disk which include rotary entrainment means. The transmittal of rotary motion to the sleeve is effected by means of the guide disk. The rotary entrainment means on the guide disk can be in the form of a polygon. To effectuate the penetration of the sleeve as completely as possible, the engagement faces are located at the trailing end region of the sleeve as flanks on axially extending projections at the trailing end. Such projections can engage into matching recesses in the guide disk. The projections can be dimensioned so that they are sheared off if a specific torque is exceeded, whereby the rotary drive tool is protected from overloads. Moreover, it is advantageous to locate the engagement faces at the trailing end region of the sleeve as circumferential projections which serve as depth stops in addition to transmitting the rotary motion.

In forming the fastening element assembly and connecting the bolt in the sleeve, it is appropriate for the bolt to include rotary entrainment means. Such rotary entrainment means can be formed as an internal or external polygonal surface. A thread, together with a matching adapter, can also serve for transmitting rotary motion.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a side view of a sleeve in positively locked engagement with a guide disk and embodying the present invention;

FIG. 2 is an end view of the sleeve and guide disk shown in the direction of the arrow A in FIG. 1;

FIG. 3 is an axially extending sectional view through the combination sleeve and guide disk taken along the line III—III in FIG. 2;

FIG. 4 is a side view, partly in section, of a fastening element assembly, made up of the sleeve, guide disk and a fastening element or bolt, after a borehole has been drilled in the receiving material;

FIG. 5 is a side view, partly in section, of the fastening element assembly displayed in FIG. 4, after the bolt has been driven through the sleeve into the receiving material;

FIG. 6 is a view similar to FIG. 5, of another fastening element assembly embodying the present invention;

DETAILED DESCRIPTION OF THE INVENTION

Figure 7:
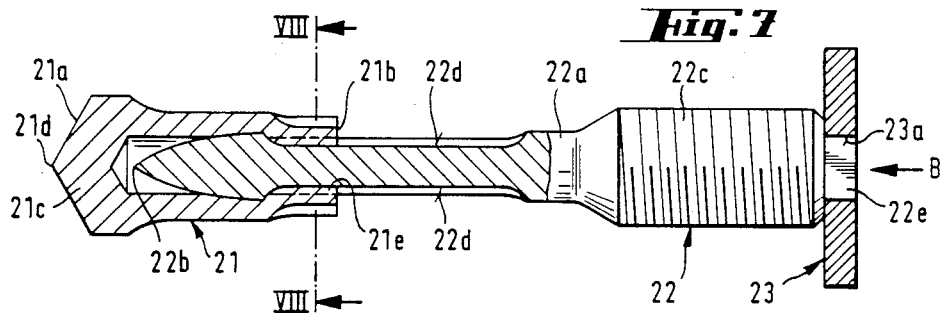
FIG. 7 is an axially extending view, partly in section, of still another fastening element assembly embodying the present invention.

In FIGS. 1 to 5 a fastening element assembly is displayed, made up of an axially extending sleeve 1, a guide disk 2, and an axially extending bolt 3. As viewed in FIG. 1, the sleeve 1, has a leading end 1a at the left and a trailing end 1b at the right, with the end 1a leading in the setting or drilling direction. Leading end 1a is formed as a arrowhead-shaped cutter plate 1c, with a centered tip 1d. Trailing end 1b has engagement faces 1e shaped as rotary entrainment means. Engagement faces 1e are located on opposite sides of projections 1f, extending axially from the trailing end 1b of the sleeve. Guide disk 2 has recesses 2a at its inner periphery, which have a cross-sectional shape corresponding to the cross-sectional shape of the projections 1f, affording a positively locked connection between the disk and the trailing end 1b of the sleeve 1. At its radially outer periphery, the guide disk has wrenching faces 2b for receiving rotary movement. In addition, the guide disk 2 has two radially extending notches 2c extending inwardly from its radially outer periphery and in alignment with the recesses 2a in its radially inner periphery. Due to the arrangement of the recesses 2a, and the notches 2c, a web 2d extends between each pair of a recess and a notch. The web 2d serves as a rated breakpoint. Bolt 3 has an axially extending shank 3a, extending from a pointed tip 3b at its leading end toward its trailing end. Shank 3a has a reduced diameter as compared to a threaded section 3c, extending from the shank to the trailing end of the bolt. The threaded section 3c, affords an engagement means for attaching a load to the anchored bolt. In FIG. 4, the sleeve 1 has been drilled into the receiving material 4, forming borehole 4a. Sleeve 1 extends into the receiving material 4 until the guide disk 2 contacts the surface of the receiving material. The arrangement of the fastening element assembly, as set forth in FIG. 4, illustrates a first stage in the process of setting the fastening element assembly in the receiving material.

In FIG. 5, the bolt 3 has been driven through the sleeve 1 and into the receiving material 4. As a result, the sleeve 1 is radially expanded into anchored engagement within the borehole 4a. Further, guide disk 2 has fractured in the region of the webs 2d and can be removed.

In FIG. 6, another embodiment of the fastening element assembly is shown, anchored in the receiving material 4 and fastening a structural component 5 by means of a hexagonal nut 7, threaded on a bolt 13, to the surface of the receiving material. Bolt 13 includes an axially extending shank 13a with a pointed tip 13b at its leading end, and a threaded section 13c extending from its trailing end to the shank 13a. A washer 6 is located between the structural component 5 and the adjacent surface of the hexagonal nut 7. The difference between the fastening element assembly in FIG. 6, and the one displayed in FIGS. 1-5, is that the sleeve 11 is provided with a drilling crown having a plurality of cutting teeth 11d at its leading end 11a. At its trailing end 11b, the sleeve has axial projections 11f, with engagement faces 11e for introducing torque to the sleeve in a manner similar to that shown in FIGS. 1-5.

Figures 8, 9, 11:
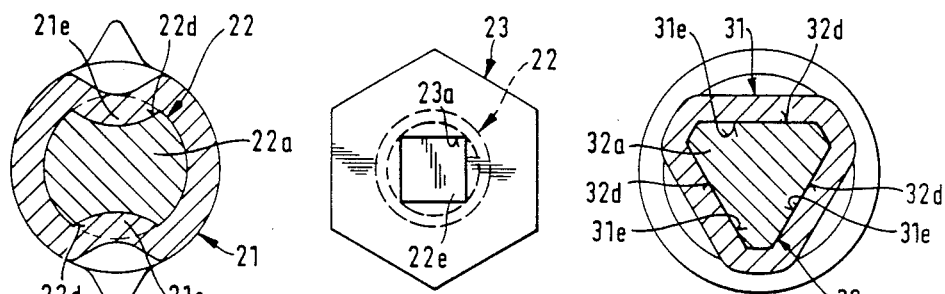
FIG. 8 is a cross-sectional view, taken along the line VIII—VIII in FIG. 7.
FIG. 9 is an end view of the fastening element assembly, taken in the direction of the arrow B in FIG. 7.
FIG. 11 is a cross-sectional view, taken along the line XI—XI, in FIG. 10.

Another fastening element assembly, in accordance with the present invention, is shown in FIGS. 7 to 9, and is made up of an axially extending sleeve 21, an axially extending bolt 22, and a disk 23. Sleeve 21 has a closed leading end 21a, and a trailing end 21b. Leading end 21a of the sleeve 21 is formed as a cutter plate 21c with the plate having an arrowhead-shape with a central tip 21d. Bolt 22 has a generally cylindrically shaped shank 22a extending from a pointed tip 22b at its leading end toward its trailing end. A threaded section 22c extends from the trailing end of the shank 22a to the trailing end of the bolt 22. The shank 22a has two axially extending grooves 22d disposed diametrically opposite one another and located in spaced relationship from the tip 21d. As shown in FIG. 8, the axially extending grooves 22d have a flute-shape. Sleeve 21 has two axially extending projections 21e, each disposed in engagement within one of the longitudinal grooves 22d. As a result, sleeve 21 and bolt 22 are secured together in a positively locked manner. At its rear end, the bolt 22 has an axially extending square projection 22e. As can be seen in FIG. 9, the radially outer periphery of the disk 23 has a hexagonal shape. In its central region, the disk has a through opening 23a, with the same shape and size as the square projection 22e on the bolt. Accordingly, disk 23 and bolt 22 are connected together in a positively locked manner. The rotary drive for the fastening element assembly is transmitted from the disk 23 to the bolt 22, and then from the bolt through its axially extending grooves 22d and the axially extending projections 21e to the sleeve 21.

Figure 10:
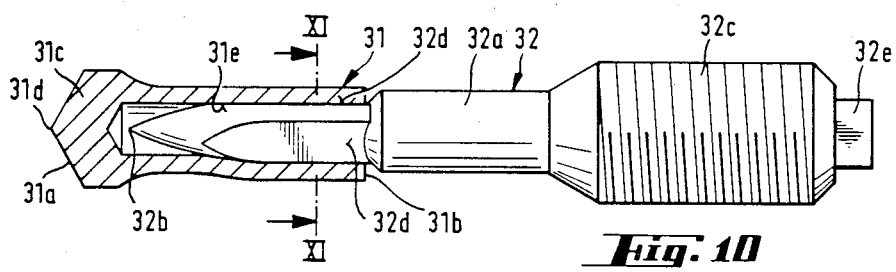
FIG. 10 is an axially extending view, partly in section, similar to FIG. 7, depicting another fastening element assembly, embodying the present invention.

In FIGS. 10 and 11, another fastening element assembly embodying the present invention is illustrated. This fastening element assembly is made up of an axially extending sleeve 31 and an axially extending bolt 32. Sleeve 31 has a leading end 31a and a trailing end 31b. The leading end 31a of the sleeve 31 is formed as a cutter plate 31c. The cutter plate has an arrow head-like shaped leading edge with a central tip 31d. Bolt 32 has an axially extending shank 32a extending from a leading end tip 32b toward the trailing end. From the trailing end of the shank to the trailing end of the bolt, there is a threaded section 32c, having a larger diameter than the shank 32a. In the axial extending forward region of the shank 32a, spaced from its leading end tip 32b, there are axially extending flats 32d. As exhibited by FIG. 11, the flats 32d form a generally isosceles triangular cross-sectional shape for the shank. As a result, in the axially extending region of the flats 32d, the shank has the general shape as a triangle. Sleeve 31, fitted on the forward end of the shank 32, has three engagement faces 31e corresponding to the flats 32d. Accordingly, the sleeve 31 and the bolt 32 are in positively locked engagement with one another. The rotary drive of the sleeve 31, for drilling a borehole in a receiving material, is effected by a square shaped projection 32e on the trailing end of the bolt 32, and is transmitted from the bolt 32 over its flats 32d to the engagement faces 31e of the sleeve 31.

Figure 12:
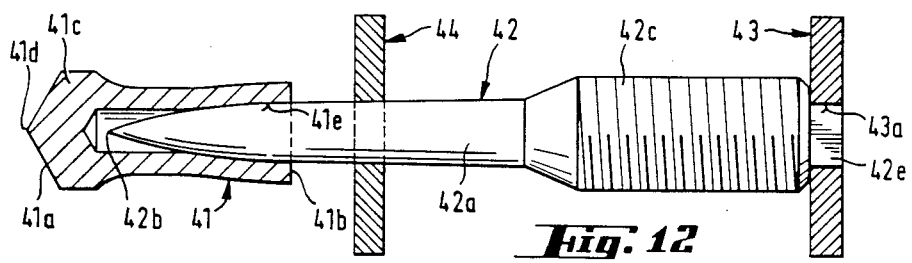
FIG. 12 is a axially extending view, partly in section, of a further fastening assembly embodying the present invention.

In FIG. 12, still another embodiment of the present invention is shown, where the fastening element assembly includes an axially extending sleeve 41, an axially extending bolt 42 and a disk 43. Sleeve 41 has a leading end 41a and a trailing end 41b. The leading end 41a of the sleeve 41 is formed as a arrowhead-shaped cutter plate 41c with a central tip 41d. Bolt 42 has an axially extending shank 42a extending from a leading end tip 42b toward the trailing end. Extending from the trailing end of the bolt to the trailing end of the shank 42a, is a threaded section 42c having a larger diameter than the shank. The sleeve 41 is pressed onto the shank 42a of the bolt 42 which widens conically from its leading end toward its trailing end. The rotary entrainment of the sleeve 41 with the bolt 42 is effected by means of engagement faces 41e on the inside surface of the sleeve 41. Due to the conical shape of the shank 42a, a frictionally locked connection is maintained between the bolt 42 and the sleeve 41 during the entire drilling operation. Another guide disk 44 is located on the shank 42a for guiding the fastening element assembly. At its trailing end, the bolt 42 has a square-shaped projection 42e corresponding to the embodiment displayed in FIGS. 7 and 10. Disk 43 transmits rotary drive to the bolt 42 which, in turn, rotates the sleeve so that it drills a hole into a receiving material.

While specific embodiments of the invention have been shown and described in detail to illustrate the application of the inventive principles, it will be understood that the invention may be embodied otherwise without departing from such principles.

We claim:

1. Fastening element assembly for use in a hard receiving material, such as concrete, masonry and the like, comprising an axially extending sleeve and an axially extending bolt, each having a leading end facing in the insertion direction into the receiving material and a trailing end facing in the opposite direction, said bolt having a pointed tip at the leading end thereof, said bolt having a shank extending from the pointed tip toward the trailing end, said shank having an axial length greater than the axial length of said sleeve, said sleeve having an inside surface, said shank having an outside surface corresponding at least partially to the inside surface of said sleeve, wherein the improvement comprises that said sleeve has engagement faces for transferring rotational motion to said sleeve where the rotational motion acts about the axis of said sleeve, said sleeve has a cutting edge at the leading end of said sleeve extending transversely of the sleeve axis, and said sleeve has an axially extending bore and said bolt is frictionally engageble within said sleeve bore so that the rotational motion transferred to said sleeve can drill a hole into the receiving material, and the pointed tip portion being longer than said sleeve such that after the sleeve is drilled into and set in the receiving material the pointed tip of said bolt can be driven axially through said sleeve bore from the leading end of said sleeve into the receiving material.

2. Fastening element assembly, as set forth in claim 1, wherein said cutting edge comprises a cutter plate extending diametrically of the axis of said sleeve and said cutter plate having an arrow head-shaped configuration with a central tip.

3. Fastening element assembly, as set forth in claim 1, wherein said engagement faces provide a frictionally locked connection with said shank of said bolt and said engagement faces extend in the circumferential direction about the inside surface of said sleeve.

4. Fastening element assembly, as set forth in claim 1, wherein said engagement faces extend transversely of the circumferential direction of said sleeve.

5. Fastening element assembly, as set forth in claim 1, wherein said bolt comprises entrainment means for receiving rotary driving force so that the rotation of said bolt is transmitted from said shank to said engagement faces on said sleeve.

6. Fastening element assembly, as set forth in claim 5, wherein said entrainment means comprises a projection extending axially outwardly from the trailing end of said bolt and said projection having a polygonally shaped cross-section transversely of the axis of said bolt.

7. Fastening element assembly for use in a hard receiving material, such as concrete, masonry and the like, comprising an axially extending sleeve and an axially extending bolt, each having a leading end facing in the insertion direction into the receiving material and a trailing end facing in the opposite direction, said bolt having a pointed tip at the leading end thereof, said bolt having a shank extending from the pointed tip toward the trailing end, said shank having an axial length greater than the axial length of said sleeve, said sleeve having an inside surface, said shank having an outside surface corresponding at least partially to the inside surface of said sleeve, wherein the improvement comprises that said sleeve has engagement faces for transferring rotational motion to said sleeve about the axis of said sleeve thereof, and said sleeve has a cutting edge at the leading end of said sleeve extending transversely of the sleeve axis, said bolt comprises entrainment means for receiving rotary driving force so that the rotation of said bolt is transmitted from said shank to said engagement faces on said sleeve, said entrainment means comprises a projection extending axially outwardly from the trailing end of said bolt and said projection having a polygonally shaped cross-section transversely of the axis of said bolt, a guide disk having a through opening corresponding in shape to said projection on said bolt engages said projection, and said guide disk having means thereon for receiving rotary driving force for transmitting the rotary driving force through said projection to said bolt and from said bolt to said sleeve, a guide disk having a through opening corresponding in shape to said projection on said bolt engages said projection, and said guide disk having means thereon for receiving rotary driving force for transmitting the rotary driving force through said projection to said bolt and from said bolt to said sleeve.

* * * * *